US012223688B2

(12) United States Patent
Kuroda

(10) Patent No.: US 12,223,688 B2
(45) Date of Patent: Feb. 11, 2025

(54) INFORMATION PROCESSING APPARATUS AND INFORMATION PROCESSING METHOD

(71) Applicant: Information System Engineering Inc., Tokyo (JP)

(72) Inventor: Satoshi Kuroda, Tokyo (JP)

(73) Assignee: INFORMATION SYSTEM ENGINEERING INC., Tokyo (JP)

( * ) Notice: Subject to any disclaimer, the term of this patent is extended or adjusted under 35 U.S.C. 154(b) by 457 days.

(21) Appl. No.: 17/783,775

(22) PCT Filed: Jul. 16, 2021

(86) PCT No.: PCT/JP2021/026721
§ 371 (c)(1),
(2) Date: Jun. 9, 2022

(87) PCT Pub. No.: WO2022/019222
PCT Pub. Date: Jan. 27, 2022

(65) Prior Publication Data
US 2023/0033090 A1     Feb. 2, 2023

(30) Foreign Application Priority Data

Jul. 20, 2020  (JP) ................. 2020-123695

(51) Int. Cl.
*G06V 10/75* (2022.01)
*G06V 20/50* (2022.01)
*G06V 10/82* (2022.01)

(52) U.S. Cl.
CPC ............. *G06V 10/75* (2022.01); *G06V 20/50* (2022.01); *G06V 10/82* (2022.01); *G06V 2201/10* (2022.01)

(58) Field of Classification Search
CPC ........ G06V 10/75; G06V 20/50; G06V 10/82; G06V 2201/10
See application file for complete search history.

(56) References Cited

U.S. PATENT DOCUMENTS

| | | | |
|---|---|---|---|
| 2013/0163860 A1* | 6/2013 | Suzuki | G06V 30/224 |
| | | | 382/159 |
| 2020/0125066 A1 | 4/2020 | Abe et al. | |
| 2021/0166468 A1* | 6/2021 | Kuroda | G06T 19/006 |

FOREIGN PATENT DOCUMENTS

| | | |
|---|---|---|
| JP | 2016-51052 | 4/2016 |
| JP | 2019-109844 | 7/2019 |

(Continued)

OTHER PUBLICATIONS

International Search Report issued Oct. 5, 2021 in International Application No. PCT/JP2021/026721.

*Primary Examiner* — Quang N Vo
(74) *Attorney, Agent, or Firm* — Wenderoth, Lind & Ponack, L.L.P.

(57) ABSTRACT

An information processing apparatus outputs operational information as information regarding a first operation and a second operation performed by an operator on an object as an operation target, the information processing apparatus including a scene estimator, a chunk estimator, a transition destination suggestion unit, and an output unit. The scene estimator obtains first images as images of a scene in a state where the operator performs the first operation and the second operation, and estimates the scene by using a first learned model describing an association between the first image and a scene ID that uniquely indicates the scene. The chunk estimator obtains second images as images of an object of the first operation and the second operation, and estimates a chunk by using one of a plurality of second (Continued)

learned models that store an association between the second image and one or a plurality of meta IDs for chunk.

4 Claims, 9 Drawing Sheets

(56) References Cited

FOREIGN PATENT DOCUMENTS

| | | |
|---|---|---|
| JP | 2020-67448 | 4/2020 |
| JP | 6710387 | 6/2020 |
| WO | 2020/026871 | 2/2020 |

* cited by examiner

LEARNING PHASE

INFORMATION PROCESSING APPARATUS AND INFORMATION PROCESSING METHOD

TECHNICAL FIELD

The present invention relates to an information processing apparatus and an information processing method.

BACKGROUND ART

For example, in an operation assisting system of Patent Document 1, a rule describing a determination condition of an operation target or an operation state is generated based on a manual describing matters such as procedures, contents, or precautions of the operation. The operation target and the operation state are recognized based on sensor information from a device mounted to an operator, and operation assisting information is output based on the generated rule and a recognition result of recognition means.

Patent Document 1: JP-A-2019-109844

DISCLOSURE OF THE INVENTION

Problems to be Solved by the Invention

However, in a conventional method as described in Patent Document 1, information accumulated as a document, such as a manual, can be searched only by the document. For example, when searching a document by the paragraph, the document needs to be reconstructed into structured information. Reconstruction of every document as a search target is often not realistic in terms of cost-effectiveness. Information by the document causes a problem in which a reader of the document has to browse a large amount of unnecessary information, thus making it difficult to rapidly handle it.

One aspect of an embodiment of the present invention has an objective of providing an information processing apparatus that presents a necessary amount of information for an operator to the operator at the operator's request without reconstructing a large amount of information.

Solutions to the Problems

An information processing apparatus outputs operational information as information regarding a first operation and a second operation performed by an operator on an object as an operation target, the information processing apparatus including a scene estimator, a chunk estimator, a transition destination suggestion unit, and an output unit. The scene estimator obtains first images as images of a scene in a state where the operator performs the first operation and the second operation, and estimates the scene by using a first learned model describing an association between the first image and a scene ID that uniquely indicates the scene. The chunk estimator obtains second images as images of an object of the first operation and the second operation, and estimates a chunk by using one of a plurality of second learned models that store an association between the second image and one or a plurality of meta IDs for chunk corresponding on a one-to-one basis to a chunk ID that uniquely indicates the chunk as information dividing or suggesting the operational information. The transition destination suggestion unit outputs suggestion information that offers a suggestion regarding a next operation by comparing the first operation and the second operation that have actually been performed with a state transition table that stores in advance a relation between the first operation and the second operation when the second operation is performed. The output unit outputs the chunk. The chunk estimator selects one of the plurality of second learned models using a model ID corresponding on a one-to-one basis to a scene ID, and the meta ID for chunk uniquely indicates a meta value for chunk as information regarding a property of the object.

An information processing method is performed by an information processing apparatus that outputs operational information as information regarding a first operation and a second operation performed by an operator on an object as an operation target. The information processing method includes: a first step of obtaining first images as images of a scene in a state where the operator performs the first operation and the second operation, and estimating the scene by using a first learned model describing an association between the first image and a scene ID that uniquely indicates the scene; a second step of obtaining second images as images of an object of the first operation and the second operation, and estimating a chunk by using one of a plurality of second learned models that store an association between the second image and one or a plurality of meta IDs for chunk corresponding on a one-to-one basis to a chunk ID that uniquely indicates the chunk as information dividing or suggesting the operational information; a third step of outputting suggestion information that offers a suggestion regarding a next operation by comparing the first operation and the second operation that have actually been performed with a state transition table that stores in advance a relation between the first operation and the second operation when the second operation is performed: and a fourth step of outputting the chunk. A chunk estimator selects one of the plurality of second learned models using a model ID corresponding on a one-to-one basis to a scene ID, and the meta ID for chunk uniquely indicates a meta value for chunk as information regarding a property of the object.

Effects of the Invention

According to one aspect of the embodiment of the present invention, the information processing apparatus that presents a necessary amount of information for an operator to the operator at the operator's request without reconstructing a large amount of information can be achieved.

DESCRIPTION OF PREFERRED EMBODIMENTS

The following describes in detail one aspect of an embodiment of the present invention with reference to the drawings. For example, a description will be given of information referred to by an operator when performing an unpacking operation (hereinafter may be referred to as a first operation) of unpacking an object as an operation target at a logistical transit point and the like, and a packing operation (hereinafter may be referred to as a second operation) of packing the object in the first operation to be made into a new object. Note that the operators in the first operation and the second operation may be different, and the operators in the first operation and the second operation may be the same.

(Embodiment)

Figure 1:
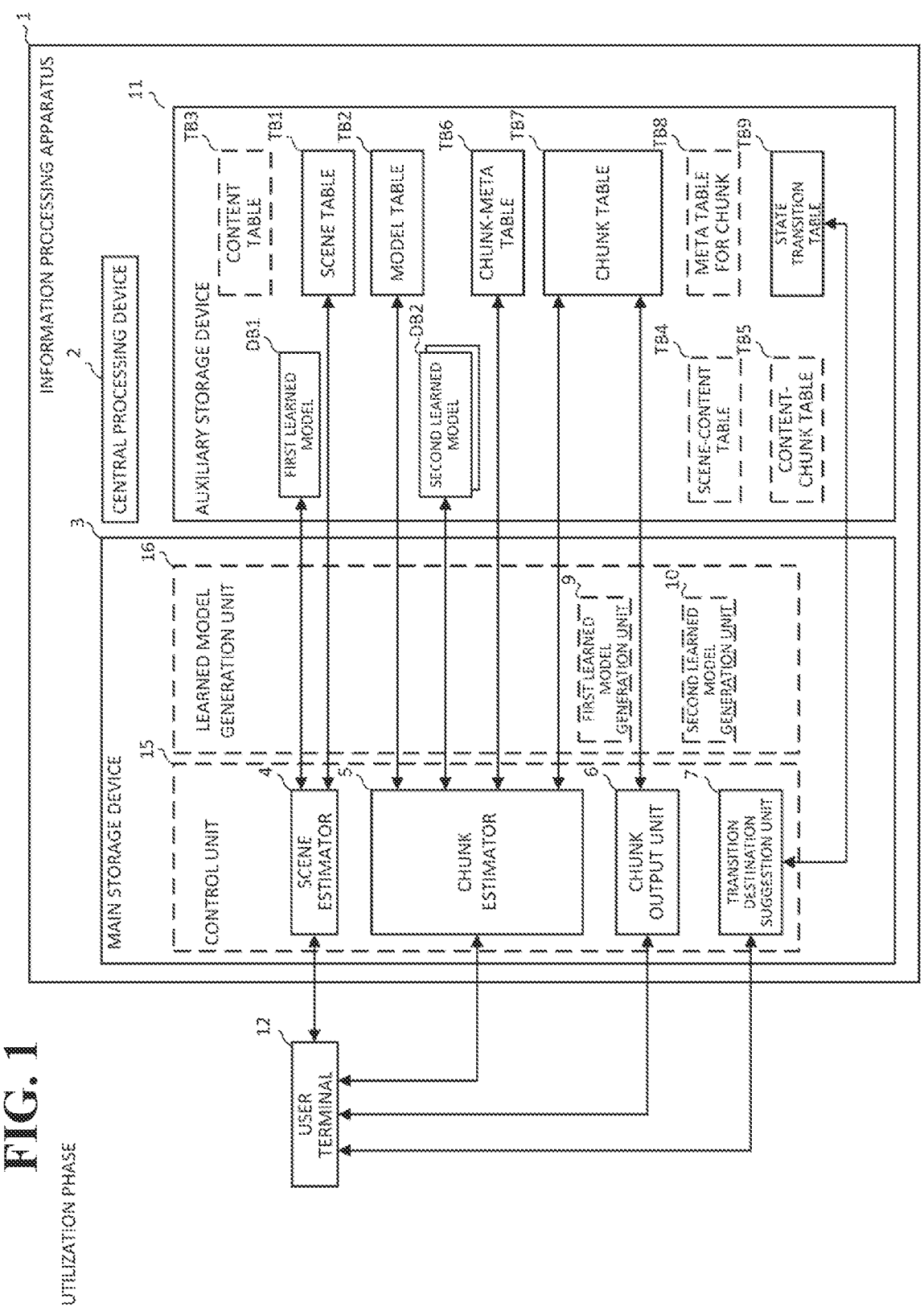
FIG. 1 is a block diagram describing a configuration of an information processing apparatus in a utilization phase according to an embodiment.

First, a description will be given of an information processing apparatus 1 in a utilization phase with reference to FIG. 1. FIG. 1 is a block diagram describing a configuration of the information processing apparatus 1 in the utilization phase according to the embodiment. The information processing apparatus 1 includes a central processing device 2, a main storage device 3, and an auxiliary storage device 11.

The central processing device 2 is, for example, a Central Processing Unit (CPU), which calls programs stored in the main storage device 3 to execute a process. The main storage device 3 is, for example, Random Access Memory (RAM), which stores programs, such as a scene estimator 4, a chunk estimator 5, a chunk output unit 6, a confirmation unit 7, a first learned model generation unit 9, and a second learned model generation unit 10, which are described later.

Note that programs including the scene estimator 4, the chunk estimator 5, the chunk output unit 6, and the confirmation unit 7 may be referred to as a control unit 15, and programs including the first learned model generation unit 9 and the second learned model generation unit 10 may be referred to as a learned model generation unit 16.

The auxiliary storage device 11 is, for example, a Solid State Drive (SSD) and/or a Hard Disk Drive (HDD), which stores databases such as a first learned model DB1, a first learning model DB1', a second learned model DB2, and a second learning model DB2', and tables such as a scene table TB1, a model table TB2, a content table TB3, a scene-content table TB4, a content-chunk table TB5, a chunk-meta table TB6, a chunk table TB7, a meta table for chunk TB8, and a state transition table TB9, which are described later.

As described in FIG. 1, the information processing apparatus 1 that outputs operational information as information regarding an operation performed by the operator includes the scene estimator 4, the chunk estimator 5, the chunk output unit 6 that outputs a chunk as information dividing or suggesting the operational information, and the confirmation unit 7 in the utilization phase. Here, the operational information may be referred to as contents, and a content ID uniquely indicates the operational information. The chunk output unit 6 outputs the chunk to, for example, a user terminal 12.

The scene estimator 4 estimates a scene in a state where the operator performs an operation. Specifically, the scene estimator 4 obtains first images 20 and 40 described later during the unpacking operation and the packing operation, and estimates the scene using the first learned model DB1 that stores an association between the first image 20 and a scene ID that uniquely indicates the scene.

The scene estimator 4 obtains a scene name from the scene table TB1 as a table in which the scene IDs and the scene names which are names of the scenes are associated on a one-to-one basis using the scene ID as a search key, and transmits the scene name to the user terminal 12. The user terminal 12 presents the scene name received from the scene estimator 4 to the operator.

Note that the scene estimator 4 determines whether it is the unpacking operation or the packing operation by, for example, referring to chronologically successive images before and after the first images 20 and 40. For example, regarding the first image 20, in an image chronologically before the first image 20, a box 21 packed with an object 23 described later is captured, and in an image chronologically after the first image 20, the object 23 unpacked from the box is captured. Therefore, the scene estimator 4 can determine that the first image 20 is an image of the unpacking operation.

In addition, regarding the first image 40, in an image chronologically before the first image 40, the unpacked object 23 and an unpacked object 43 are captured, and in an image chronologically after the first image 40, a box 41 packed with the objects 23 and 43 is captured. Therefore, the scene estimator 4 can determine that the first image 20 is an image of the packing operation.

The chunk estimator 5 obtains an image of the object 23 in the first operation and second images 30 and 50 that are images of an object 51 in the second operation, and estimates a chunk using one of a plurality of the second learned models DB2 that store an association between the second images 30 and 50 and one or a plurality of meta IDs for chunk corresponding on a one-to-one basis to a chunk ID that uniquely indicates the chunk.

The chunk estimator 5 selects one of the plurality of second learned models DB2 using a model ID corresponding on a one-to-one basis to the scene ID. The meta ID for chunk uniquely indicates a meta value for chunk as information regarding properties of the objects 23, 43, and 51.

The chunk estimator 5 obtains a model ID from the model table TB2 as a table in which the model IDs and the scene IDs are associated on a one-to-one basis using the scene ID as a search key. Further, the chunk estimator 5 obtains a chunk ID from the chunk-meta table TB6 as a table in which the chunk IDs and the meta IDs for chunk are associated on a one-to-one or a one-to-multiple basis using the meta ID for chunk as a search key.

The chunk estimator 5 obtains a chunk summary that indicates an outline of a chunk from the chunk table TB7 using the chunk ID as a search key, and transmits the chunk summary to the user terminal 12. The user terminal 12 presents the chunk summary received from the chunk estimator 5 to the operator.

The chunk estimator 5 obtains a chunk from the chunk table TB7 using the chunk ID as a search key, and transmits the chunk to the user terminal 12. The user terminal 12 presents the chunk received from the chunk estimator 5 to the operator.

Note that the chunk table TB7 is a table in which the chunks, the chunk summaries, and hash values are each associated with a chunk ID on a one-to-one basis. The hash value is used, for example, to confirm whether or not the chunk has been changed.

The transition destination suggestion unit 7 outputs suggestion information that offers a suggestion regarding a next operation by comparing the first operation and the second operation that have actually been performed with the state transition table TB9 that stores in advance a relation between the first operation and the second operation when information regarding the second operation is processed. The transition destination suggestion unit 7 outputs the suggestion information to, for example, the user terminal 12.

Next, a description will be given of the information processing apparatus 1 in a learning phase with reference to FIG. 2. In the learning phase, for example, the first images 20 and 40 and one or a plurality of second images 30, 35, 50, and 55 that are input from an input device (not illustrated) are learned as a combination. Here, the learning includes, for example, supervised learning.

Figure 2:
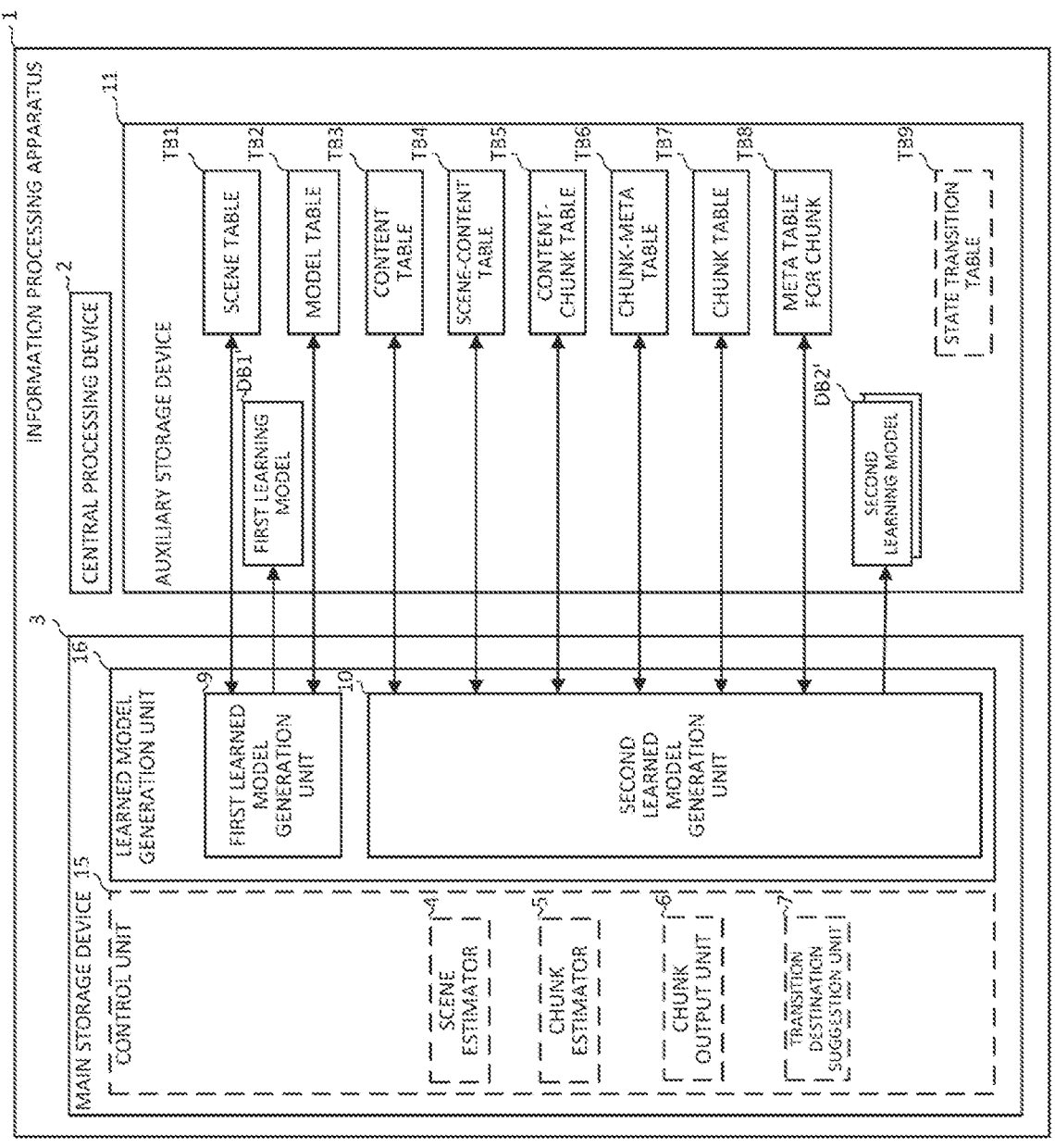
FIG. 2 is a block diagram describing a configuration of the information processing apparatus in a learning phase according to the embodiment.

FIG. 2 is a block diagram describing a configuration of the information processing apparatus 1 in the learning phase according to the embodiment. In the learning phase, the information processing apparatus 1 includes the first learned model generation unit 9 and the second learned model generation unit 10.

The first learned model generation unit 9 is a program that generates the first learned model DB1 by causing the first learning model DB1' to learn the scene ID and the first images 20 and 40 as a pair.

The first learned model generation unit 9 obtains a scene ID from the scene table TB1 regarding the first images 20 and 40, and obtains a model ID corresponding to the scene ID from the model table TB2.

The second learned model generation unit 10 is a program that generates the second learned model DB2 by specifying the model ID and causing the second learning model DB2' to learn the one or plurality of meta IDs for chunk and the second images 30 and 50 as a pair.

The second learned model generation unit 10 obtains a content ID from the scene-content table TB4 as a table in which the scene IDs and the content IDs are associated on a one-to-many basis using the scene ID as a search key. Note that here, the scene ID as a search key is associated with the first images 20 and 40 that are paired with the second images 30 and 50 as processing targets.

The second learned model generation unit 10 obtains a content from the content table TB3 as a table in which the content IDs and the contents are associated on a one-to-one basis using the content ID as a search key.

The second learned model generation unit 10 obtains a chunk ID from the content-chunk table TB5 as a table in which the content IDs and the chunk IDs are associated on a one-to-one or a one-to-many basis using the content ID as a search key.

The second learned model generation unit 10 obtains a chunk from the chunk table TB7 using the chunk ID as a search key, and obtains a meta ID for chunk from the chunk-meta table TB6 using the chunk ID as a search key.

The second learned model generation unit 10 obtains a meta value for chunk from the meta table for chunk TB8 using the meta ID for chunk as a search key. The meta table for chunk TB8 is a table in which category IDs for chunk, category names for chunk, and the meta values for chunk are each associated with a meta ID for chunk on a one-to-one basis.

The category ID for chunk uniquely indicates a category name for chunk as a name of a category to which a meta value for chunk belongs. Note that, upon referring to the second images 30 and 50, the second learned model generation unit 10 confirms that the obtained chunk, content, and meta value for chunk have no problem.

Values with problems are determined as abnormal values and not used in the supervised learning. Therefore, the second learned model generation unit 10 can generate a highly accurate learned model DB2, and the information processing apparatus 1 in the utilization phase can perform a highly accurate process.

Figure 3:
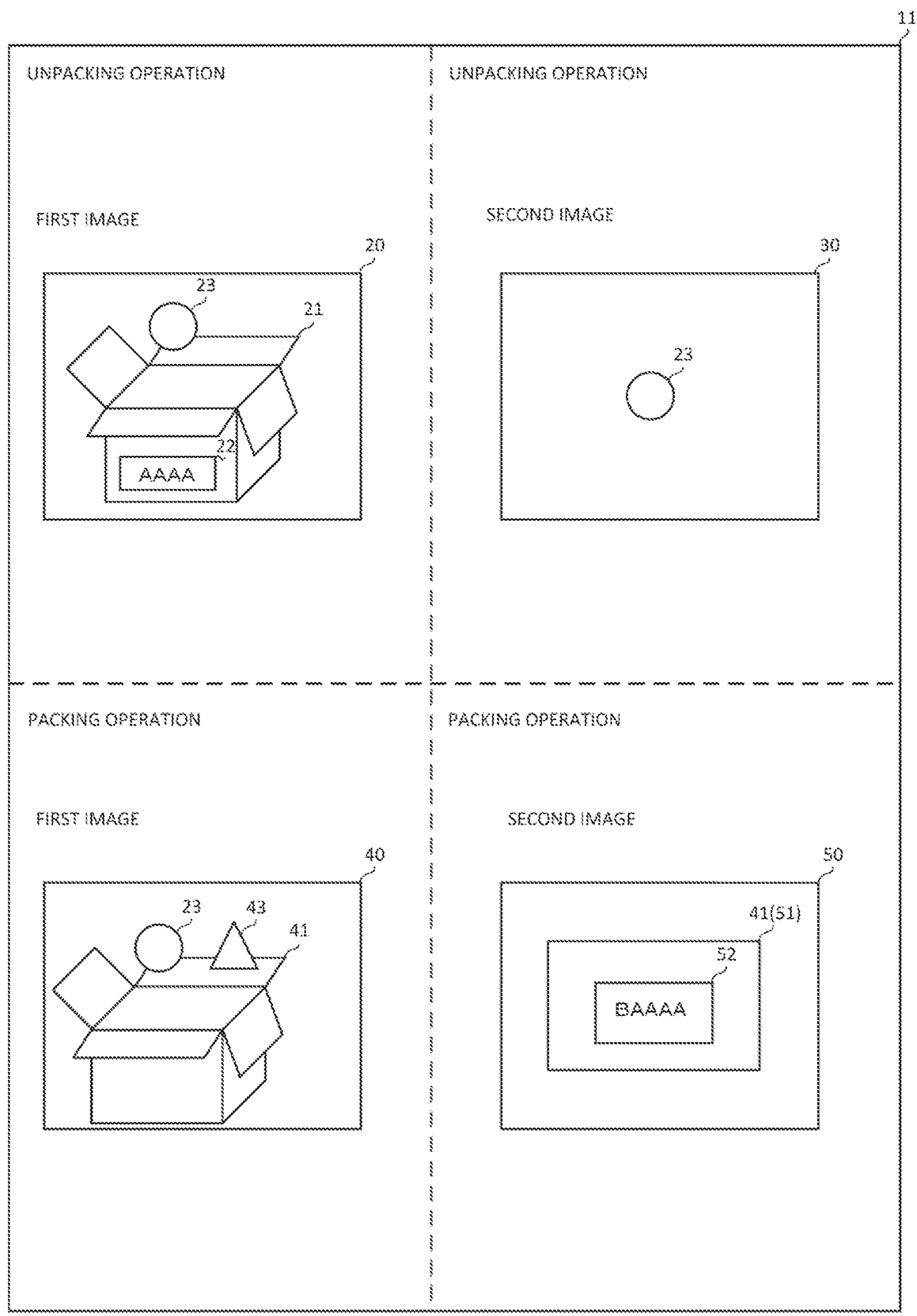
FIG. 3 is a diagram describing respective first images and second images of an unpacking operation and a packing operation according to the embodiment.

Next, a description will be given of images obtained by the user terminal 12 and processed by the information processing apparatus 1 as information with reference to FIG. 3. FIG. 3 is a diagram describing the respective first images 20 and 40 and second images 30 and 50 of the unpacking operation and the packing operation according to the embodiment.

The respective first images 20 and 40 and second images 30 and 50 of the unpacking operation and the packing operation are stored in, for example, the auxiliary storage device 11 and displayed on, for example, the user terminal 12. FIG. 3 describes an example of simultaneously displaying the first images 20 and 40 and the second images 30 and 50, which include the images of the first operation, when performing the second operation. However, the first images 20 and 40 may each be displayed separately on the user terminal 12.

In the first image 20 of the unpacking operation, for example, the object 23, the box 21 from which the object 23 has been unpacked, and an order placement number 22 (hereinafter may be referred to as a first number) are captured. In the first image 40 of the packing operation, for example, the objects 23 and 43 that were the operation targets of the unpacking operation and the box 41 in which the objects 23 and 43 are to be packed are captured.

In the second image 30 of the unpacking operation, for example, the object 23 is captured. In the second image 50 of the packing operation, for example, the objects 23 and 43 that were the operation targets of the unpacking operation, the box 41 in which the objects 23 and 43 are to be packed, and an order acceptance number 52 (hereinafter may be referred to as a second number) are captured.

The order placement number 22 is assumed to be, for example, a number assigned when a person in charge of the order placement at a logistical transit point places an order, and the order acceptance number 52 is assumed to be, for example, a number assigned when a person in charge of the order acceptance at the logistical transit point accepts the order. For example, when the scene ID is decided by considering up to the order placement number 22, the chunk estimator 5 estimates the order acceptance number 52 via the meta ID for chunk.

Figure 4:
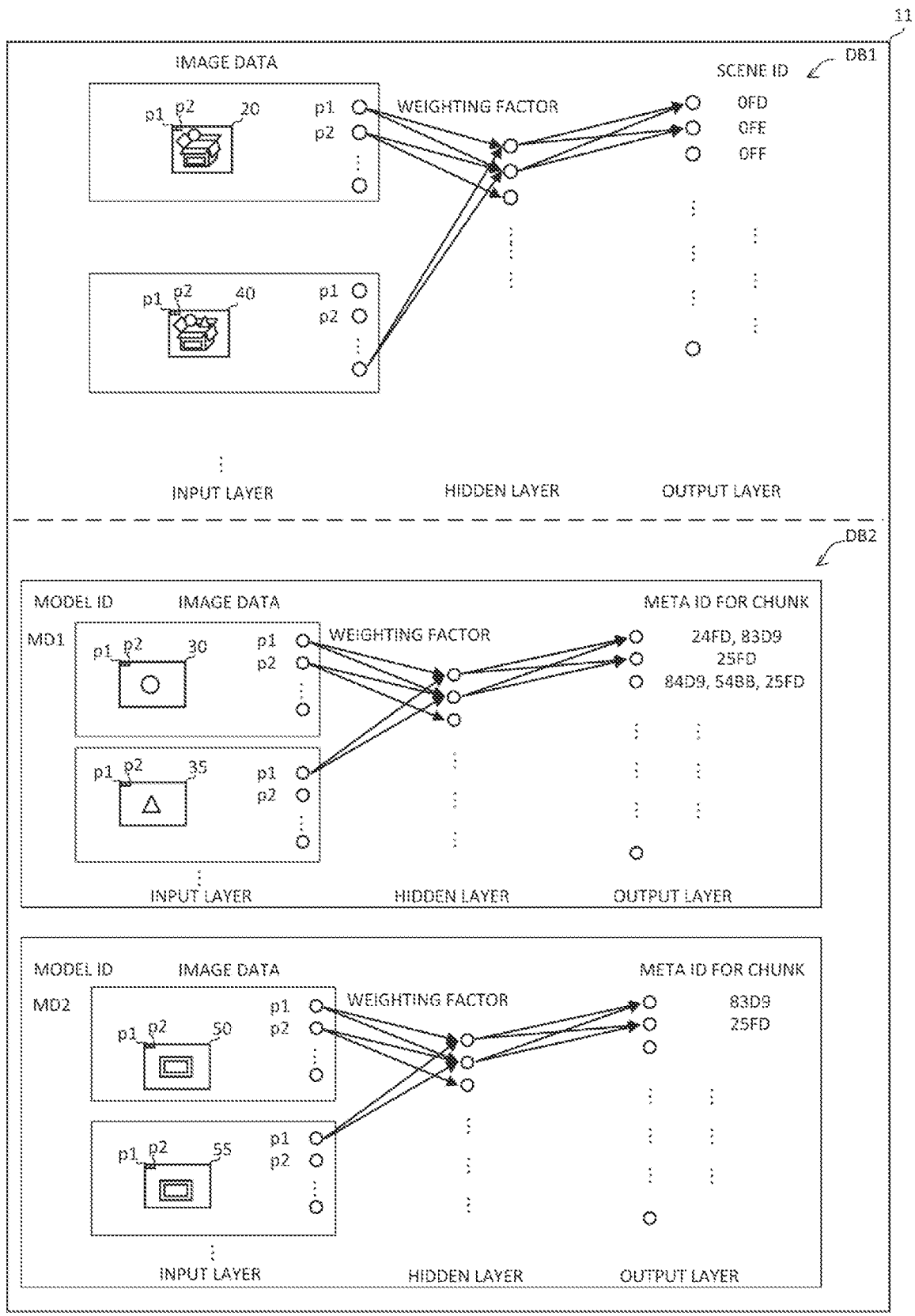
FIG. 4 is a diagram describing a first learned model and a second learned model according to the embodiment.

Next, a description will be given of the first learned model DB1 and the second Teamed model DB2 with reference to FIG. 4. FIG. 4 describes the first learned model DB1 and the second learned model DB2 according to the embodiment.

The first learned model DB1 stores an association between a plurality of the first images 20 and 40 and a plurality of scene IDs. The association is generated by machine learning using a plurality of pairs of the first images 20 and 40 and the scene ID as learning data. Here, the machine learning includes, for example, a convolution neural network (CNN: Convolution Neural Network).

The association between the first images 20 and 40 and the scene ID can be specifically indicated by the convolution neural network expressed by nodes indicated as circles and edges indicated as arrows in FIG. 4 and weighting factors set to the edges. Note that, as described in FIG. 4, input of the first images 20 and 40 to the first learned model DB1 is performed by, for example, the pixel, such as pixels p1 and p2.

A plurality of the second learned models DB2 are associated with the model ID on a one-to-one basis. Each of the second learned models DB2 stores an association between a plurality of the second images 30, 35, 50, and 55 and a plurality of one or a plurality of meta IDs for chunk. The association is generated by the machine learning using a plurality of pairs of the second images 30, 35, 50, and 55 and the one or plurality of meta IDs for chunk as learning data. Here, the machine learning includes, for example, the convolution neural network (CNN: Convolution Neural Network).

The association between the plurality of second images 30, 35, 50, and 55 and the plurality of the one or plurality of meta IDs for chunk can be specifically indicated by the convolution neural network expressed by the nodes indicated as circles and the edges indicated as arrows in FIG. 4 and the weighting factors set to the edges. Note that, as described in FIG. 4, input of the second images 30, 35, 50, and 55 to the second learned model DB2 is performed by, for example, the pixel, such as the pixels p1 and p2.

Figure 5:
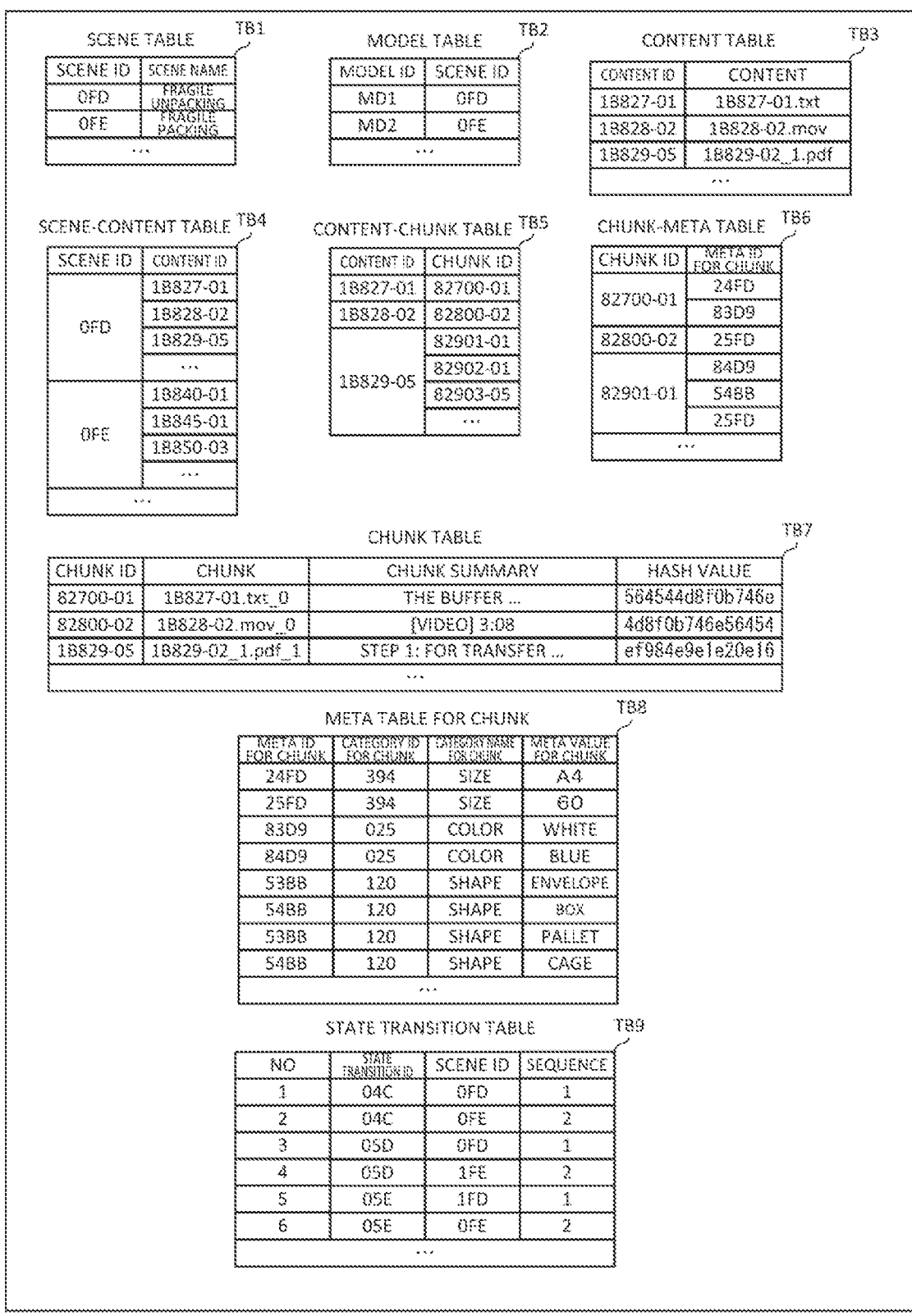
FIG. 5 is a diagram describing information stored in an auxiliary storage device according to the embodiment.

Next, a description will be given of the scene table TB1, the model table TB2, the content table TB3, the scene-content table TB4, the content-chunk table TB5, the chunk-meta table TB6, the chunk table TB7, the meta table for chunk TB8, and the state transition table TB9, which are information stored in the auxiliary storage device 11, with reference to FIG. 5. FIG. 5 is a diagram indicating information stored in the auxiliary storage device 11 according to the embodiment.

The scene ID stored in the scene table TB1 and the like is a 3 digit hexadecimal, such as OFD. The scene name stored in the scene table TB1 and the like is, for example, fragile unpacking and fragile packing.

The model ID stored in the model table TB2 and the like is expressed by two alphabetical letters and a 1 digit decimal, such as MD1. The content ID stored in the content table TB3 and the like is expressed by a 5 digit hexadecimal and a 2 digit decimal, such as 1B827-01. The content stored in the content table TB3 and the like has a file name that is the content ID and is expressed with an extension, such as 1B827-01.txt, and stores a pointer to a content entity and the like.

The chunk ID stored in the content-chunk table TB5 and the like is expressed by 5 digit and 2 digit decimals, such as 82700-01. The meta ID for chunk stored in the chunk-meta table TB6 and the like is a 4 digit hexadecimal, such as 24FD.

The chunk stored in the chunk table TB7 is expressed by a file name of a content corresponding to a target chunk and a 1 digit decimal, such as 1B827-01.txt_0, and stores a pointer to a part of a content entity that corresponds to the target chunk, and the like.

The chunk summary stored in the chunk table TB7 is a document that summarizes a chunk content, such as "The buffer . . . ." The hash values stored in the chunk table TB7 are 15 digit hexadecimals, such as 564544d8f0b746e.

The category ID for chunk stored in the meta table for chunk TB8 is a 3 digit decimal, such as 394. The category name for chunk stored in the meta table for chunk TB8 is, for example, a size, color, or shape of a target envelope, box, pallet, or cage.

The meta value for chunk stored in the meta table for chunk TB8 is, for example, A4, 60, white, blue, envelope, box, pallet, or cage. Note that, the values of the category ID for chunk and the category name for chunk may be NULL.

A state transition ID stored in the state transition table TB9, for example, uniquely indicates a combination of two scene IDs, and is a 3 digit hexadecimal, such as 04C. The state transition ID may correspond to, for example, an order sheet that controls an order.

A sequence stored in the state transition table TB9 is 1 and 2. For example, 1 indicates the unpacking operation while 2 indicates the packing operation. Note that, in the state transition table TB9, Nos. assigned in sequence from 1 are stored to uniquely identify, for example, the combinations of the state transition IDs and the scene IDs.

As described in the scene-content table TB4, the content-chunk table TB5, and the chunk-meta table TB6, a data structure of the operational information has a hierarchical structure in which the meta ID for chunk is the first layer as the lowermost layer, the chunk ID is the second layer, the content ID is the third layer, and the scene ID is the fourth layer as the uppermost layer.

Figure 6:
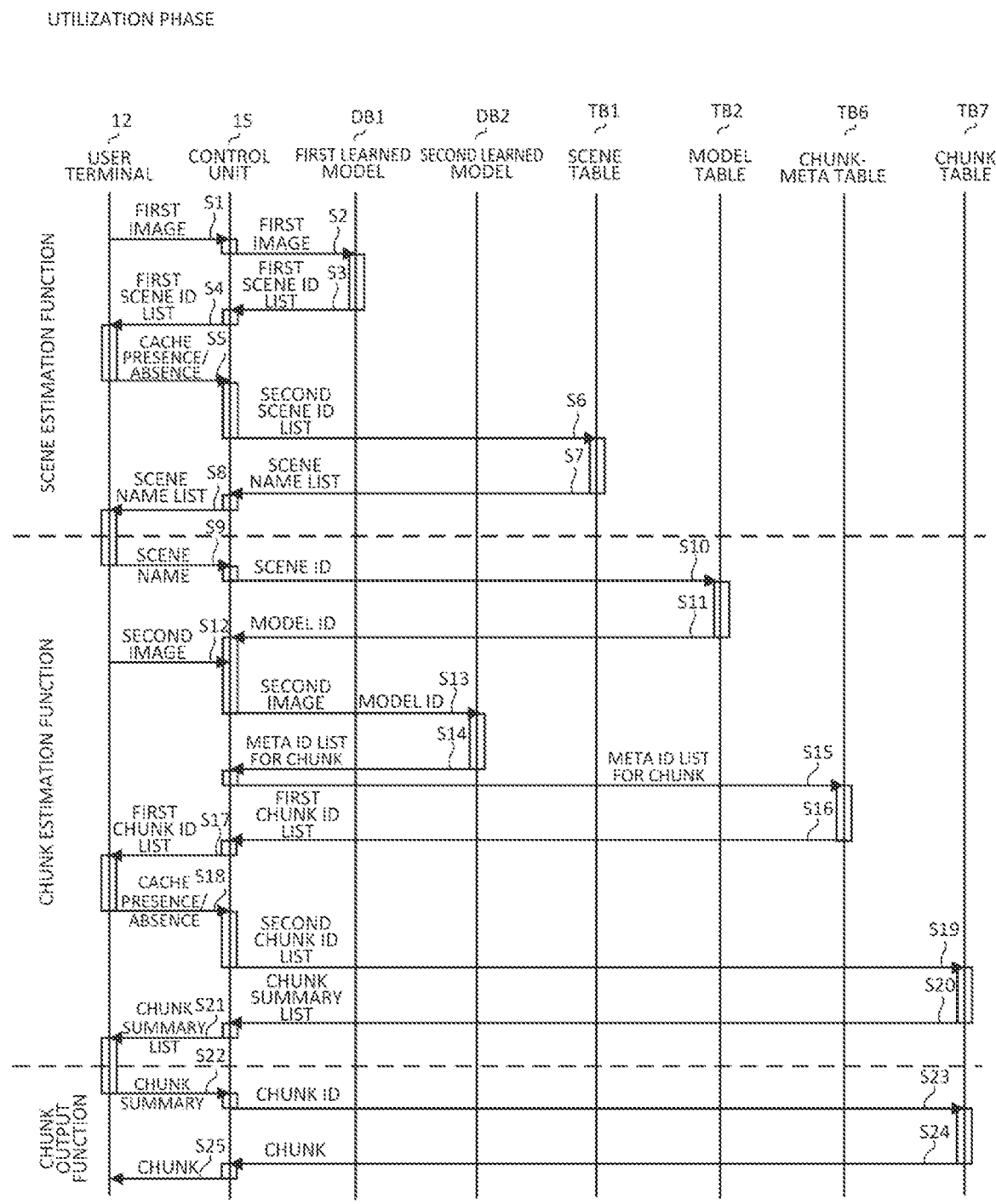
FIG. 6 is a sequence diagram describing a scene estimation function, a chunk estimation function, and a chunk output function according to the embodiment.

Next, a description will be given of a scene estimation function, a chunk estimation function, and a chunk output function with reference to FIG. 6. FIG. 6 is a sequence diagram describing the scene estimation function, the chunk estimation function, and the chunk output function according to the embodiment.

An information processing function in the utilization phase is constituted of the scene estimation function achieved by a scene estimation process S60 described later, the chunk estimation function achieved by a chunk estimation process S80 described later, and the chunk output function achieved by a chunk output process S100 described later.

First, a description will be given of the scene estimation function. The scene estimator 4 included in the control unit 15 receives the first images 20 and 40 from the user terminal 12 (S1), and inputs the received first images 20 and 40 to the first learned model DB1 (S2).

The first learned model DB1 selects one or a plurality of scene IDs closely associated with the received first images 20 and 40, and outputs the selected one or plurality of scene IDs (hereinafter may be referred to as a first scene ID list) to the scene estimator 4 (S3).

Once the scene estimator 4 obtains the first scene ID list, the scene estimator 4 directly transmits the first scene ID list to the user terminal 12 (S4). The user terminal 12 transmits cache presence/absence regarding each of the scene IDs included in the first scene ID list to the scene estimator 4 (S5).

The user terminal 12 retains a table equivalent to the scene table TB1 regarding information processed in the past. The user terminal 12 searches inside the table retained by the user terminal 12 using the scene ID of the received first scene ID list as a search key. The scene ID of which a search result is found is determined as presence of a cache, and the scene ID of which a search result is not found is determined as absence of a cache.

The scene estimator 4 searches the scene table TB1 using one or a plurality of scene IDs (hereinafter may be referred to as a second scene ID list) without a cache in the user terminal 12 among the respective scene IDs included in the first scene ID list received from the user terminal 12 as a search key (S6).

The scene estimator 4 obtains scene names (hereinafter may be referred to as a scene name list) corresponding to the respective scene IDs included in the second scene ID list as a search result from the scene table TB1 (S7).

The scene estimator 4 directly transmits the obtained scene name list to the user terminal 12 (S8). According to Steps S1 to S8, the information processing apparatus 1 in the utilization phase achieves the scene estimation function that estimates scenes of the first images 20 and 40 by estimating the scene names.

Next, a description will be given of the chunk estimation function. The user terminal 12 presents the received scene name list to the operator. The operator selects, for example, one scene name from the presented scene name list. The user terminal 12 transmits the scene name selected by the operator to the chunk estimator 5 included in the control unit 15 (S9).

The chunk estimator 5 uses the scene ID corresponding to the scene name received from the user terminal 12 as a search key (S10) to search the model table TB2 and obtains a model ID (S11).

The chunk estimator 5 receives the second images 30, 35, 50, and 55 from the user terminal 12 (S12). The chunk estimator 5 specifies one of the plurality of second learned models DB2 according to the model ID obtained from the model table TB2, and inputs the second images 30, 50 to the specified second learned model DB2 (S13).

The second learned model DB2 selects one or a plurality of one or a plurality of meta IDs for chunk that are closely associated with the second images 30, 35, 50, and 55, and outputs the selected one or plurality of the one or plurality of meta IDs for chunk (hereinafter may be referred to as a meta ID list for chunk) to the chunk estimator 5 (S14).

The chunk estimator 5 searches the chunk-meta table TB6 using each of the one or plurality of meta IDs for chunk included in the meta ID list for chunk as a search key (S15).

The chunk estimator 5 obtains one or a plurality of chunk IDs (hereinafter may be referred to as a first chunk ID list) as a search result from the chunk-meta table TB6 (S16). The chunk estimator 5 directly transmits the obtained first chunk ID list to the user terminal 12 (S17).

The user terminal 12 transmits cache presence/absence regarding each of the chunk IDs included in the first chunk ID list to the chunk estimator 5 (S18). Regarding information processed in the past, the user terminal 12 retains a table including a chunk ID column and a chunk summary column in the chunk table TB7.

The user terminal 12 searches inside the table retained by the user terminal 12 using the chunk ID of the received first chunk ID list as a search key. The chunk ID of which a search result is found is determined as presence of a cache, and the chunk ID of which a search result is not found is determined as absence of a cache.

The chunk estimator 5 searches the chunk table TB7 using one or a plurality of chunk IDs (hereinafter may be referred to as a second chunk ID list) without a cache in the user terminal 12 among the respective chunk IDs included in the first chunk ID list received from the user terminal 12 as a search key (S19).

The chunk estimator 5 obtains chunk summaries (hereinafter may by referred to as a chunk summary list) corresponding to the respective chunk IDs included in the second chunk ID list as a search result from the chunk table TB7 (S20). The chunk estimator 5 directly transmits the obtained chunk summary list to the user terminal 12 (S21).

According to Steps S9 to S21, the information processing apparatus 1 in the utilization phase achieves the chunk estimation function that estimates chunks of the objects 23, 43, and 51 by estimating the chunk summaries.

Next, a description will be given of the chunk output function. The user terminal 12 presents the received chunk summary list to the operator. The operator selects, for example, one chunk summary from the presented chunk summary list. The user terminal 12 transmits the chunk summary selected by the operator to the chunk output unit 6 included in the control unit 15 (S22).

The chunk output unit 6 uses the chunk ID corresponding to the chunk summary received from the user terminal 12 as a search key (S23) to search the chunk table TB7 and obtains a chunk (S24).

The chunk output unit 6 directly transmits the obtained chunk to the user terminal 12 (S25). The user terminal 12 presents the received chunk to a user. According to Steps S22 to S25, the information processing apparatus 1 in the utilization phase achieves the chunk output function that outputs the chunks of the objects 23, 43, and 51.

Figure 7:
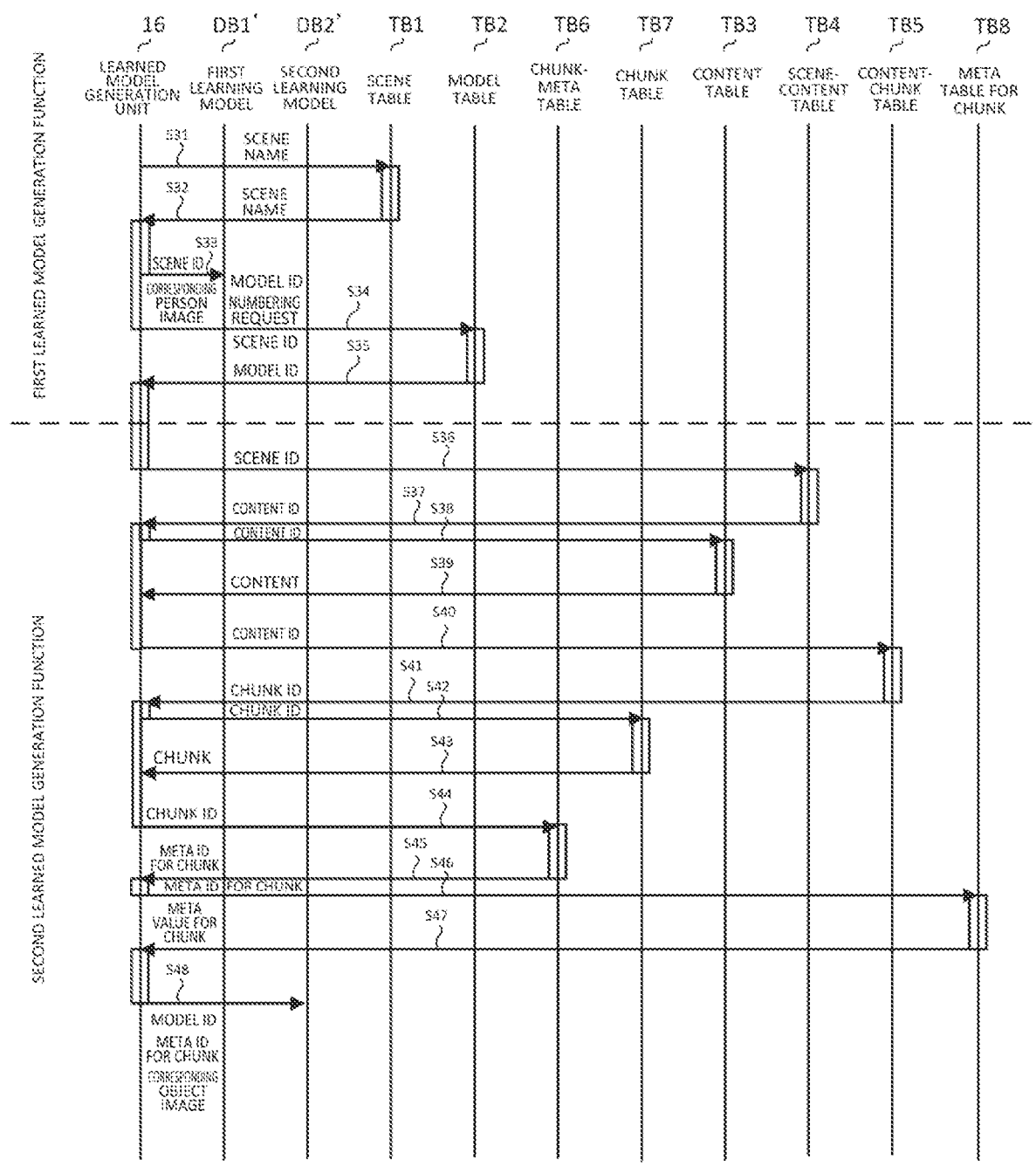
FIG. 7 is a sequence diagram describing a first learned model generation function and a second learned model generation function according to the embodiment.

Next, a description will be given of the first learned model generation function and the second learned model generation function with reference to FIG. 7. FIG. 7 is a sequence diagram describing the first learned model generation function and the second learned model generation function according to the embodiment.

An information processing function in the learning phase is constituted of the first learned model generation function achieved by a first learned model generation process and the second learned model generation function achieved by a second learned model generation process.

First, a description will be given of the first learned model generation function. In the first Teamed model generation unit 9 included in the learned model generation unit 16, a combination of a scene name, the first images 20 and 40, and one or a plurality of the second images 30, 35, 50, and 55 as a process target is decided to search the scene table TB1 generated in advance in the scene table TB1 using the scene name as a search key (S31).

The first learned model generation unit 9 obtains a scene ID as a search result from the scene table TB1 (S32), and causes the first learning model DB1 to learn the first images 20 and 40 and the scene ID as a pair (S33).

The first learned model generation unit 9 transmits the obtained scene ID to the model table TB2 and performs a model ID obtainment request (S34). The model table TB2 generates a model ID corresponding to the received scene ID and stores a combination of the scene ID and the model ID.

Next, the first learned model generation unit 9 obtains the model ID from the model table TB2 (S35). According to Steps S31 to S35, the information processing apparatus 1 in the learning phase achieves the first learned model generation function that generates the first learned model DB1.

Next, a description will be given of the second learned model generation function. The second learned model generation unit 10 included in the learned model generation unit 16 searches the scene-content table TB4 generated in advance using the scene ID received from the first learned model generation unit 9 in Step S32 as a search key (S36).

The second learned model generation unit 10 obtains a content ID as a search result from the scene-content table TB4 (S37), and uses the obtained content ID as a search key to search the content table TB3 generated in advance (S38).

The second learned model generation unit 10 obtains a content as a search result from the content table TB3 (S39), and uses the content ID obtained in Step S37 as a search key to search the content-chunk table TB5 generated in advance (S40).

The second learned model generation unit 10 obtains a chunk ID as a search result from the content-chunk table TB5 (S41), and uses the obtained chunk ID as a search key to search the chunk table TB7 generated in advance (S42).

The second learned model generation unit 10 obtains a chunk as a search result from the chunk table TB7 (S43), and uses the chunk ID obtained in Step S41 as a search key to search the chunk-meta table TB6 generated in advance (S44).

The second learned model generation unit 10 obtains one or a plurality of meta IDs for chunk as a search result from the chunk-meta table TB6 (S45), and uses each of the obtained meta IDs for chunk as a search key to search the meta table for chunk TB8 generated in advance (S46).

The second learned model generation unit 10 obtains each of the meta values for chunk corresponding to each of the meta IDs for chunk as a search result from the meta table for chunk TB8 (S47).

The second learned model generation unit 10 performs a confirmation that the content obtained in Step S39, the chunk obtained in Step S43, and each of the meta values for chunk obtained in Step S47 have no problem by referring to the first images 20 and 40 and the second images 30, 35, 50, and 55.

The second learned model generation unit 10 performs the confirmation by referring to, for example, the order placement number 22 captured in the first image 20, a shape of the object 23 captured in the second image 30, the objects 23 and 43 captured in the first image 40, and the order acceptance number 52 captured in the second image 50.

If a problem is found as a result of the referencing, such as a case where the content, the chunk, and the meta value for chunk indicate information that are obviously different from the objects 23, 43, and 51 captured in the second images 30, 35, 50, and 55, the process of the target combination is terminated.

Next, the second learned model generation unit 10 causes the second learning model DB2' to learn the model ID, the second images 30, 35, 50, and 55, and the one or plurality of meta IDs for chunk as a set (S48). According to Steps S36 to S48, the information processing apparatus 1 in the learning phase achieves the second learned model generation function that generates the second learned model DB2.

Figure 8:
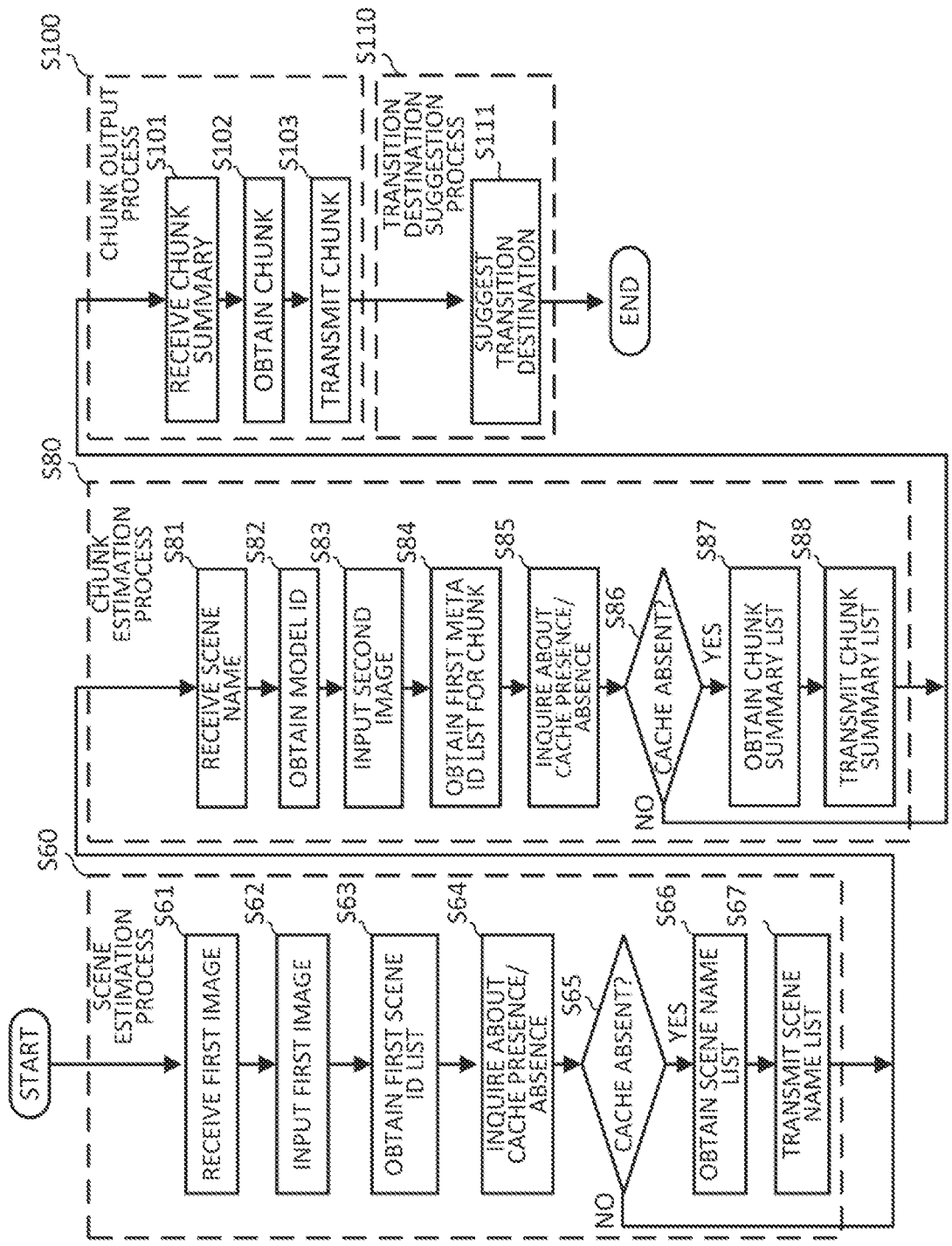
FIG. 8 is a flowchart describing a processing procedure of an information process in the utilization phase according to the embodiment.

Next, a description will be given of an information process in the utilization phase with reference to FIG. 8. FIG. 8 is a flowchart describing a processing procedure of the information process in the utilization phase according to the embodiment. The information process in the utilization phase is constituted of the scene estimation process S60, the chunk estimation process S80, the chunk output process S100, and a transition destination suggestion process S110.

First, a description will be given of the scene estimation process S60. The scene estimation process S60 is constituted of Step S61 to Step S67. When the scene estimator 4 receives the first images 20 and 40 from the user terminal 12 (S61), the scene estimator 4 inputs the first images 20 and 40 to the first learned model DB1 (S62).

The scene estimator 4 obtains a first scene ID list as output from the first learned model DB1 (S63), directly transmits the first scene ID list to the user terminal 12, and inquires of the user terminal 12 about cache presence/absence (S64).

In a case where every response result from the user terminal 12 is presence of a cache (S65: NO), the scene estimation process S60 is terminated, and the chunk estimation process S80 is started. In a case where even one of the response results from the user terminal 12 is absence of a cache (S65: YES), the scene estimator 4 obtains a scene name list from the scene table TB1 (S66), and directly transmits the scene name list to the user terminal 12 (S67), and the scene estimation process S60 is terminated.

Next, a description will be given of the chunk estimation process S80. The chunk estimation process S80 is constituted of Step S81 to Step S88. The chunk estimator 5 receives the scene name selected by the operator from the user terminal 12 (S81).

When the chunk estimator 5 receives the scene name from the user terminal 12, the chunk estimator 5 obtains a model ID from the model table TB2 (S82). Next, the chunk estimator 5 specifies one of the plurality of second learned models DB2 according to the model ID, and inputs the second images 30, 35, 50, and 55 received from the user terminal 12 to the specified second learned model DB2 (S83).

The chunk estimator 5 obtains a meta ID list for chunk as output from the second learned model DB2 (S84), and obtains a first chunk ID list from the chunk-meta table TB6 (S85). Next, the chunk estimator 5 directly transmits the first chunk ID list to the user terminal 12, and inquires of the user terminal 12 about cache presence/absence (S86).

In a case where every response result from the user terminal 12 is presence of a cache (S86: NO), the chunk estimation process S80 is terminated, and the chunk output process S100 is started. In a case where even one of the response results from the user terminal 12 is absence of a cache (S86: YES), the chunk estimator 5 obtains a chunk summary list from the chunk table TB7 (S87), and directly transmits the chunk summary list to the user terminal 12 (S88), and the chunk estimation process S80 is terminated.

Next, a description will be given of the chunk output process S100. The chunk output process S100 is constituted of Step S101 to Step S103. The chunk output unit 6 receives the chunk summary selected by the operator from the user terminal 12 (S101).

When the chunk output unit 6 receives the chunk summary from the user terminal 12, the chunk output unit 6 obtains a chunk from the chunk table TB7 (S102), and directly transmits the chunk to the user terminal 12 (S103), and the chunk output process S100 is terminated.

Next, a description will be given of the transition destination suggestion process Silo. The transition destination suggestion process S110 is constituted of Step S111. The transition destination suggestion unit 7 outputs the suggestion information (S111). The transition destination suggestion unit 7, for example, collectively processes the first operations regarding the order sheets that are being processed in parallel, and then makes a suggestion to the operator to collectively process the second operations. Furthermore, the transition destination suggestion unit 7 makes a suggestion to the operator to collectively process the operations with the same scene ID in the first operation.

A detailed description will be given using the state transition TB9. Processes of three orders of a state transition ID "04C," a state transition ID "05D," and a state transition ID "05E" are assumed to be performed in parallel. When the operator is performing an operation of a scene ID "OFD" in the state transition ID "04C" of No. "1," the transition destination suggestion unit 7 makes a suggestion to the operator to perform an operation of the scene ID "OFD" in the state transition ID "05D" of No. "3."

When the operator is performing the operation of the scene ID "OFD" in the state transition ID "05D" of No. "3," the transition destination suggestion unit 7 makes a suggestion to the operator to perform an operation of a scene ID "1 FD" in the state transition ID "05E" of No. "5." When the operation up to this point is completed, there is no unperformed operation left in sequence "1."

When the operator is performing the operation of the scene ID "1 FD" in the state transition ID "05E" of No. "5," the transition destination suggestion unit 7 makes a suggestion to the operator to perform an operation of a scene ID "0FE" in the state transition ID "04C" of No. "2."

When the operator is performing the operation of the scene ID "0FE" in the state transition ID "04C" of No. "2," the transition destination suggestion unit 7 makes a suggestion to the operator to perform an operation of the scene ID "0FE" in the state transition ID "05E" of No. "6."

When the operator is performing the operation of the scene ID "0FE" in the state transition ID "05E" of No. "6," the transition destination suggestion unit 7 makes a suggestion to the operator to perform an operation of a scene ID "1 FE" in the state transition ID "05D" of No. "4."

Figure 9:
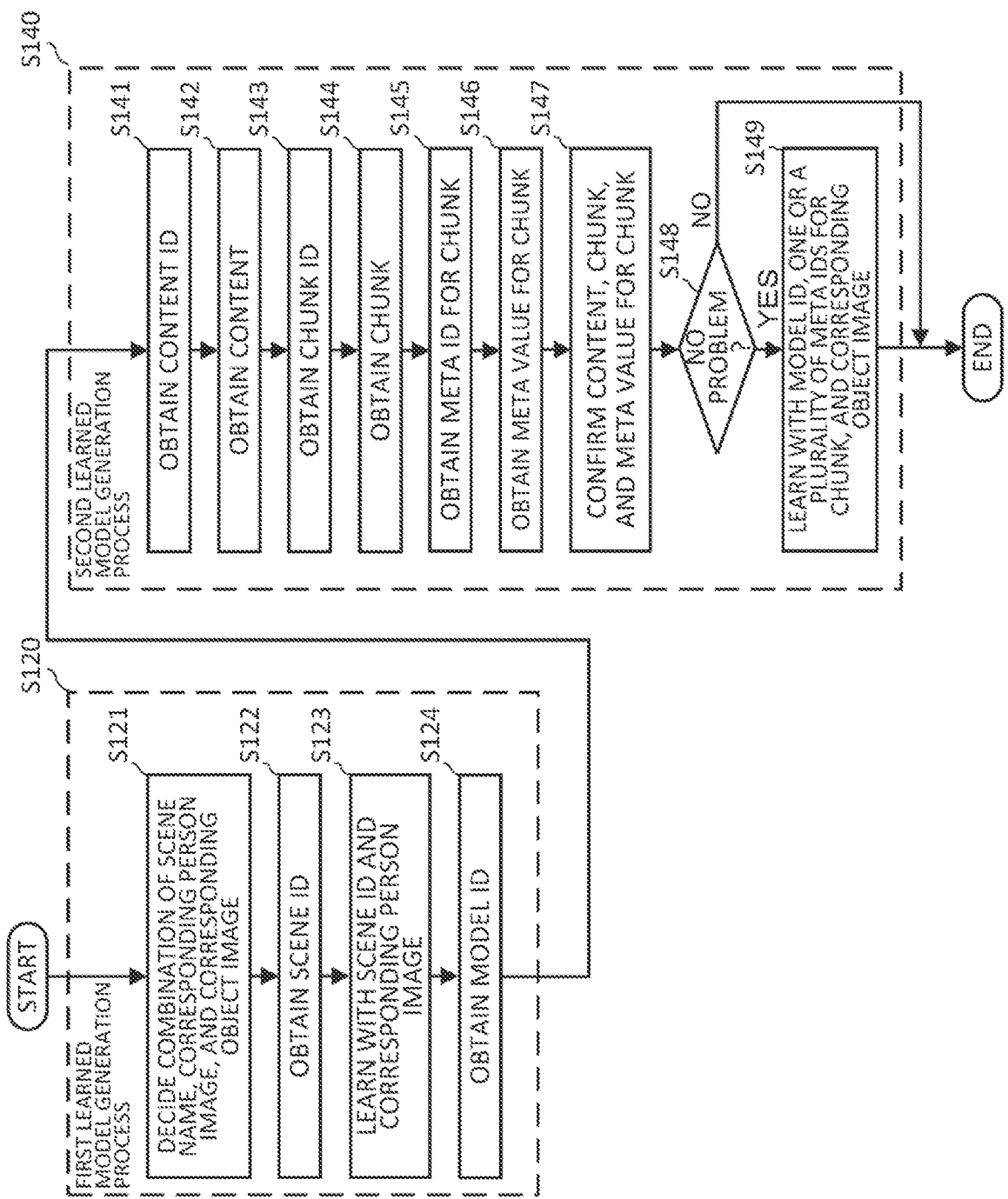
FIG. 9 is a flowchart describing a processing procedure of a confirmation process according to the embodiment.

Next, a description will be given of an information process in the learning phase with reference to FIG. 9. FIG. 9 is a flowchart describing a processing procedure of the information process in the learning phase according to the embodiment. The information process in the learning phase is constituted of the first learned model generation process S120 and the second learned model generation process S140.

First, a description will be given of the first learned model generation process S120. The first learned model generation process S120 is constituted of Step S121 to Step S124. The first learned model generation unit 9 decides a combination of a scene name, the first images 20 and 40, and one or a plurality of the second images 30, 35, 50, and 55, and searches the scene table TB1 using the scene name as a search key (S121).

The first learned model generation unit 9 obtains a scene ID as a search result from the scene table TB1 (S122), and causes the first learning model DB1' to learn the scene ID and the first images 20 and 40 as a pair (S123).

Next, the first learned model generation unit 9 transmits the scene ID obtained in Step S122 to the model table TB2 to perform a model ID obtainment request and obtains a model ID (S124).

Next, a description will be given of the second learned model generation process S140. The second learned model generation process S140 is constituted of Step S141 to Step S150. The second learned model generation unit 10 searches the scene-content table TB4 using the scene ID obtained in Step S122 as a search key and obtains a content ID (S141).

The second learned model generation unit 10 searches the content table TB3 using the obtained content ID as a search key and obtains a content (S142). In addition, the second learned model generation unit 10 searches the content-chunk table TB5 using the obtained content ID as a search key and obtains a chunk ID (S143).

The second learned model generation unit 10 searches the chunk table TB7 using the obtained chunk ID as a search key and obtains a chunk (S144). In addition, the second learned model generation unit 10 searches the chunk-meta table TB6 using the obtained chunk ID as a search key and obtains one or a plurality of meta 113s for chunk (S145).

The second learned model generation unit 10 searches the meta table for chunk TB8 using each of the obtained one or plurality of meta IDs for chunk as a search key, and obtains each of the meta values for chunk corresponding to each of the meta IDs for chunk (S146).

The second learned model generation unit 10 performs a confirmation that the content obtained in Step S142, the chunk obtained in Step S144, and each of the meta values for chunk obtained in Step S146 have no problem by referring to the first images 20 and 40 and the second images 30, 35, 50, and 55 (S147).

If a problem is found as a result of the confirmation (S148: NO), the information process of the learning phase regarding the combination being processed is terminated. If a problem is not found as a result of the confirmation (S148: YES), the second learned model generation unit 10 causes the second learning model DB2' to learn the model ID, the one or plurality of meta IDs for chunk, and the second images 30, 35, 50, and 55 as a set (S149), and the information process of the learning phase regarding the combination being processed is terminated.

As described above, according to the information processing apparatus 1 of the embodiment, the chunk that divides or suggests the operational information is presented via the user terminal 12. Therefore, by appropriately setting the chunk, a required amount of information can be presented. Furthermore, by setting the chunk to be information that suggests an entire document, large-scale reconstruction of the information is not necessary.

By using the model table TB2, even in a case where a relation between the first learned model DB1 and the second learned model DB2 changes, it is only necessary to change the model table TB2 for handling, and thus a highly maintainable apparatus can be provided.

Note that, in a case where the model table TB2 is not used, when the relation between the first learned model DB1 and the second learned model DB2 changes, the learned model DB2 needs to be regenerated.

In the embodiment, the scene estimator 4, the chunk estimator 5, the chunk output unit 6, the confirmation unit 7, the first learned model generation unit 9, the second learned model generation unit 10, and a recommended image output unit 13 are programs, but are not limited thereto, and may be logic circuits.

In addition, the scene estimator 4, the chunk estimator 5, the chunk output unit 6, the confirmation unit 7, the first learned model generation unit 9, the second learned model generation unit 10, the recommended image output unit 13, the first learned model DB1, the first learning model DB1', the second learned model DB2, the second Teaming model DB2', the scene table TB1, the model table TB2, the content table TB3, the scene-content table TB4, the content-chunk table TB5, the chunk-meta table TB6, the chunk table TB7, the meta table for chunk TB8, and the state transition table TB9 need not be implemented in a single device and instead, may be separately implemented in a plurality of devices connected by a network.

In the above learning phase described in FIG. 7 and FIG. 9, a case where the first learned model and the second learned model are generated in association has been described. However, the present invention is not limited thereto, and the first learned model DB1 and the second teamed model DB2 may be generated separately.

In a case where the first learned model DB1 and the second learned model DB2 are generated separately, for example, when a scene already exists and only a content is added, any learning regarding the scene is not necessary.

In the embodiment, a case of using a plurality of the second learned models DB2 has been described, but it is not limited thereto, and only one second learned model DB2 may be used. In addition, in the embodiment, a case where the same first learned model DB1 is used for the first operation and the second operation has been described, but it is not limited thereto, and different first learned models DB1 may be used for the unpacking operation and the packing operation.

In the embodiment, a case where the relation between the first operation and the second operation are stored in advance has been described, but the relation between the first operation and the second operation may be learned by machine learning.

In the embodiment, obtainment of user information as information of operators who are the operator performing the first operation and the operator performing the second operation, and the like has not been mentioned, but it is not limited thereto, and for example, the user information may be obtained from the user terminal 12 to be used.

DESCRIPTION OF REFERENCE SIGNS

1: Information processing apparatus
2: Central processing device
3: Main storage device
4: Scene estimator
5: Chunk estimator
6: Chunk output unit
7: Transition destination suggestion unit
9: First learned model generation unit
10: Second learned model generation unit
11: Auxiliary storage device
12: User terminal

The invention claimed is:

1. An information processing apparatus that outputs operational information as information regarding a first operation and a second operation performed by an operator on an object as an operation target, the information processing apparatus comprising:
   a scene estimator that obtains first images as images of a scene in a state where the operator performs the first operation and the second operation, and estimates the scene by using a first learned model describing an association between the first image and a scene ID that uniquely indicates the scene;
   a chunk estimator that obtains second images as images of an object of the first operation and the second operation, and estimates a chunk by using one of a plurality of second learned models that store an association between the second image and one or a plurality of meta IDs for chunk corresponding on a one-to-one basis to a chunk ID that uniquely indicates the chunk as information dividing or suggesting the operational information;
   a transition destination suggestion unit that outputs suggestion information that offers a suggestion regarding a next operation by comparing the first operation and the second operation that have actually been performed with a state transition table that stores in advance a relation between the first operation and the second operation when the second operation is performed; and
   an output unit that outputs the chunk, wherein
   the chunk estimator selects one of the plurality of second learned models using a model ID corresponding on a one-to-one basis to a scene ID, and the meta ID for chunk uniquely indicates a meta value for chunk as information regarding a property of the object.

2. The information processing apparatus according to claim 1, wherein
   the scene estimator determines whether the first image is of the first operation or the second operation by referring to chronologically successive images before and after the first image.

3. The information processing apparatus according to claim 2, wherein
   a first number is captured in the first image of the first operation, and the chunk estimator estimates a second number used in the second operation from the first number via the meta ID for chunk.

4. An information processing method performed by an information processing apparatus that outputs operational information as information regarding a first operation and a second operation performed by an operator on an object as an operation target, the information processing method comprising:
   a first step of obtaining first images as images of a scene in a state where the operator performs the first operation and the second operation, and estimating the scene by using a first learned model describing an association between the first image and a scene ID that uniquely indicates the scene;
   a second step of obtaining second images as images of an object of the first operation and the second operation, and estimating a chunk by using one of a plurality of second learned models that store an association between the second image and one or a plurality of meta IDs for chunk corresponding on a one-to-one basis to a chunk ID that uniquely indicates the chunk as information dividing or suggesting the operational information;
   a third step of outputting suggestion information that offers a suggestion regarding a next operation by comparing the first operation and the second operation that have actually been performed with a state transition table that stores in advance a relation between the first operation and the second operation when the second operation is performed; and
   a fourth step of outputting the chunk, wherein
   one of the plurality of second learned models is selected using a model ID corresponding on a one-to-one basis to a scene ID, and the meta ID for chunk uniquely indicates a meta value for chunk as information regarding a property of the object.

* * * * *